United States Patent [19]

Borman et al.

[11] 4,020,122

[45] Apr. 26, 1977

[54] PROCESS FOR THE PREPARATION OF POLYESTER COMPOSITIONS HAVING INCREASED MELT ELASTICITY

[75] Inventors: Willem F. H. Borman, Pittsfield; John A. Rock, Dalton, both of Mass.

[73] Assignee: General Electric Company, Pittsfield, Mass.

[22] Filed: Jan. 5, 1973

[21] Appl. No.: 321,266

[52] U.S. Cl. .............................. 260/835; 260/75 EP
[51] Int. Cl.² ........................................ C08L 63/00
[58] Field of Search .................................. 260/835

[56] References Cited

UNITED STATES PATENTS

| 3,560,505 | 2/1971 | Siggel | 260/835 |
| 3,621,074 | 11/1971 | Siggel | 260/835 |
| 3,639,314 | 2/1972 | Cherubin | 260/835 |
| 3,723,568 | 3/1973 | Hoeschele | 260/835 |

*Primary Examiner*—Paul Lieberman
*Attorney, Agent, or Firm*—William F. Mufatti; Granville M. Pine; Edward A. Hedman

[57] ABSTRACT

The melt elasticity of high molecular weight linear polyesters is enhanced by adding a minor proportion of an organic polyepoxide, and heating the resulting mixture. The products of the process are suitable for injection or extrusion blow molding and blown film extrusion.

8 Claims, No Drawings

PROCESS FOR THE PREPARATION OF POLYESTER COMPOSITIONS HAVING INCREASED MELT ELASTICITY

This invention relates to the production of thermoplastic polyester compositions. More particularly, it pertains to increasing the melt elasticity and/or melt viscosity of linear high molecular weight polyesters by adding an organic polyepoxide and heating the mixture. The products of the process are superior for injection or extrusion blow molding and blown film extrusion.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber-formers.

For certain application, such as injection or extrusion blow molding or blown film extrusion, it is desirable to use polyester resins of increased melt elasticity and/or melt viscosity. This is particularly desirable with poly(1,4-butylene terephthalate) which has a relatively low melt elasticity, even at very high molecular weights. Increases in melt elasticity and melt viscosity can be induced in a somewhat conventional way by including ester forming ingredients with a functionality of greater than two, such as glycerol or trimellitic esters, in the polymerization recipe. However, such expedients result in the formation of highly viscous melts, which are very difficult to remove from commonly used polymerization equipment. Moreover, during removal, such products are subject to thermal degradation, and there are economic losses due to lower production rates.

It has now been discovered that polyesters can be converted to compositions having increased melt elasticity and/or melt viscosity, rapidly and economically, by blending them with small amounts of organic compounds containing oxirane type oxygen, specifically organic compounds which are polyepoxides, and then heating the blend, e.g., in an extruder, to melt the mixture. This process causes some type of interaction, the nature of which is not clearly understood, but the final result is a composition uniquely adaptable to blow molding and blown film extrusion. Surprisingly, even through a polyfunctional epoxide is used, there is apparently no decrease in the thermoplastic nature of the linear polyester component.

Merely by way of illustration, poly(1,4-butylene terephthalate) having a melt viscosity of 6950 poises (at 250° C.) and a nominal die swell (a measure of melt elasticity) on extrusion of 30%, when dried and blended with 0.5 and 1.0%, respectively, of bis (3,4-epoxycyclohexylmethyl) adipate and extruded at 450°–550° F., has the melt viscosity increased to 9400 and 17,900 poises and the die swelling increased to 41% and 56%, respectively.

DESCRIPTION OF THE INVENTION

According to this invention there is provided a process for increasing the melt elasticity of a high molecular weight linear polyester resin, said process comprising adding an organic compound containing at least two epoxide groups, in a minor, effective proportion based on said resin, and heating the mixture until the desired increase in melt elasticity is attained.

When used herein, the expression "melt viscosity" refers to the relative flowability of the molten resin. It is a property which can be measured by means well known to those skilled in the art. One convenient method is the use of an extrusion plastometer of the type specified in test method ASTM D-1238. Another method is to use an automatic capillary rheometer of the type manufactured by Monsanto Research Company, Dayton, Ohio (this will be described hereinafter).

"Melt elasticity" is a measure of the strength of the resin in the molten state. The higher the melt elasticity, the more readily the resin can be formed into films and bottles and the like by blow molding. Melt elasticity can be measured by techniques known to those skilled in the art. One convenient method is to use an automatic capillary rheometer and to measure the degree of swell of the extrudate as it emerges from the orifice under a specific set of extrusion conditions.

To calculate the nominal die swell from the strand diameter $D_s$ and the orifice diameter $D_r$, the following formula is used:

$$\% \text{ die swell} = D_s - D_r/D_r \doteq 100$$

In an alternate test to measure the strength of the composition in the molten state, its resistance to sagging under its own weight is determined. The compositions are re-extruded through the same extruder used in their preparation, using an ⅛ inch orifice. The extrudate is allowed to drop to the floor (a distance of about 42 inches) where it is coiled on a sheet of cardboard moved laterally below the die. The diameter of the cooled strands are a measure of the die swelling and relative elasticity, with a larger diameter indicating a higher melt strength. Such data will be presented hereinafter.

The higher molecular weight linear polyesters used in the present compositions are polymeric glycol esters of terephthalic acid and isophthalic acids. They are available commercially or can be prepared by known techniques such as by the alcoholysis of esters of the pthalic acid with a glycol and subsequent polymerization, by heating glycols with the free acids or with halide derivatives thereof, and similar processes. These are described in U.S. Pat. No. 2,465,319 and U.S. Pat. No. 3,047,539 and elsewhere. It is to be understood that it is also possible to include in the polyesters, small amounts of cycloaliphatic polyols such as 1,4-dimethylolcyclohexane. In addition to phthalates, small amounts, e.g., from 0.5 to 15% by weight, of other aromatic dicarboxylic acids, such as naphthalene dicarboxylic acid, or aliphatic dicarboxylic acids, such as adipic acid, can be present in the polyester component.

Preferred polyesters will be of the family consisting of high molecular weight, polymeric glycol terephthalates or isophthalates having repeating units of the general formula:

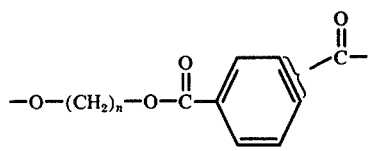

wherein $n$ is a whole number of from 2 to 10, preferably from 2 to 4, and mixtures of such esters, including copolyesters of terephthalic and isophthalic acids of up to about 30 mol. % isophthalic units.

Especially preferred polyesters are poly(ethylene terephthalate) and poly (1,4-butylene terephthalate). Special mention is made of the latter because it crystallizes at such a good rate that it may be used for injection molding without the need for nucleating agents or long cycles, as is sometimes necessary with poly (ethylene terephthalate).

Illustratively, high molecular weight polyesters will have an intrinsic viscosity of about 0.6 to 2.0 deciliters/gram and preferably from 0.7 to 1.6 deciliters/gram as measured, for example in a 60:40 phenol-tetrachloroethane mixture at 30° C. In the starting materials, the melt index will typically be about 10–15 at 250° C. using ASTM D-1238 and a 2.16 kg. load and the nominal die swell on extrusion will range from 20 to 40%.

The organic compounds having at least two epoxide groups per molecule can vary within fairly wide limits. Preferably the compound will contain only carbon, hydrogen and oxygen. The compound preferably will have a molecular weight of below about 1000, to facilitate blending with the polyester resin. Preferred such organic compounds will be those in which at least one of the epoxide groups is on a cyclohexane ring. Especially active compounds include bis(3,4-epoxycyclohexylmethyl) adipate; vinylcyclohexene di-epoxide; 3,4-epoxycyclohexyl 3,4-expoxycyclohexylcarboxylate, and the like. Other especially useful such compounds are glycidyl ether compounds, such as the bisglycidyl ether of bisphenol-A and epoxylated novolacs (a novolac is phenol-formaldehyde condensation product).

The epoxidized compounds can be made by techniques well known to those skilled in the art. For example, the corresponding $\alpha,\beta$-dihydroxy compounds can be dehydrated to produce the epoxide groups, or the correspondingly unsaturated compounds can be epoxidized by treatment with a peracid, such as peracetic acid, in well-known techniques. The compounds are also commercially available.

The organic compound having at least two epoxide groups may be employed in any effective amount, but preferably small amounts are used, e.g., at a range of 0.1 to 5% by weight. However, a particularly preferred range is 0.5 to 2% by weight. Within this particularly preferred range it has been found advantageous to employ in certain compositions about 0.5 to 1% by weight. All percentages are based on the combined weights of polyester component and the organic polyepoxide component.

The process of this invention can be carried out by a number of procedures. In one way, the organic polyepoxide compound is put into an extrusion compounder with the dry polyester resin and the blend is heated at an elevated temperature, e.g., 450°–550° F., and extruded to produce molding pellets. The polyepoxide compound is dispersed in the molten polyester resin and the melt index and melt elasticity is elevated in the process. In another procedure, the organic polyepoxide compound is mixed with the polyester resin by blending at ordinary temperatures, then the blend is fluxed on a mill, heated, e.g., at 450°–550° F., then cooled and comminuted; or the blend can be extruded at 450° to 550° F., cooled and chopped. The organic polyepoxide can also be mixed with the powdered or granular polyester and the mixture can be heated and directly formed into blow molded items using machines which compound and mold.

It is always very important to thoroughly free all of the ingredients: resin, and any optional, conventional additives from as much water as possible before carrying out the process of the invention.

In addition, compounding should be carried out to ensure that the residence time in the machine is short; the temperature is carefully controlled; the friction heat is utilized; and an intimate blend between the resin and the additive is obtained.

It should be understood that the polyepxidized organic compounds are also useful to increase the melt viscosity and/or melt elasticity of high molecular weight polyesters in further combination with other conventional additive agents such as, for example, antioxidants, carbon black, reinforcing agents, plasticizers, lubricity promotors, color stabilizers, ultraviolet absorbers, X-ray opacifiers, dyes, pigments, fillers, flame retardant agents and the like.

DESCRIPTION OF THE PREFERRED EMBODIMENTS

The following examples illustrate the invention. They are set forth as a further description but are not to be construed as limiting the invention thereto.

The melt viscosity and melt elasticity (nominal die swell) are measured in an "Automatic Capillary Rheometer", built by Monsanto Research Corporation, Dayton, Ohio, according to a design by Dr. Samuel Steingiser. It consists of an electrically heated steel cylinder with a removable die at the lower end and a pneumatically driven piston operating within the cylinder.

By a proper choice of orifice dimensions and piston loading, it is possible to cover a wide range of shear stresses under which to measure the melt viscosity of the test specimen.

The rheometer is equipped with 2 sets of four timers. The first set (Type I) is adjusted and is used to automatically initiate a melt viscosity determination. The second set (Type II) measures the time required to extrude an fixed amount of polymer during each determination.

When the first time of type I reaches zero ("runs out") the piston is activated through relay-operated valves, allowing compressed gas of pre-determined pressure to enter the pneumatic cylinder and exert a downward force of known magnitude on the piston. Through the action of a calibrated cam, operating limit-switches and relays, a small amount of polymer is forced from the barrel, after which an automatic timer of type II establishes the time required to extrude a constant volume of molten polymer. Upon completion of the cycle, the type II extrusion timer is read and its reading used to calculate melt viscosity and shear rate at the elapsed time period by well known equations, using orifice diameters, pressure drop across the orifice, and measurement of extrusion rate.

The relations used for the calculations can be found, amongst others, in table I of ASTM method D 1703-62.

The degree to which the extrudate from the rheometer swells as it emerges from the orifice under a specific set of extrusion conditions is chosen as a relative measure of the melt elasticity induced in the product. The test conditions are as follows:

Temperature: 250° C.

Orifice Dimensions: 0.295/.0145 inches
Shear Stress: 80 psi

To measure nominal die swell, extrusion of the material under test is set in motion under the above conditions. After a steady extrusion rate has been achieved, the extrudate is quickly cut near the orifice, using sharp shears, and a short length of extrudate is then collected. The diameter of the extruded strand is measured on the front portion, close to the end, to eliminate the decrease in diameter of the strand due to sagging of the melt under its own weight. The measurements are repeated several times and an average strand diameter $D_s$ is calculated.

To calculate nominal die swell from the strand diameter $D_s$ and the orifice diameter $D_r$ (= 0.0145" under the conditions chosen), the following formula is used:

$$\% \text{ die swell} = (D_s - D_r)/(D_r) \times 100$$

EXAMPLE 1

Poly(1,4-butylene terephthalate), intrinsic viscosity about 1.0 dl/g., melt viscosity about 6950 poises (at 250° C.), nominal die swell upon extrusion of 30%, and blended with 0.5% by weight of bis(3,4-epoxycyclohexylmethyl)adipate and extruded at 540° F./500° F./450° F. (rear/front/die) in a 1" Wayne extruder. The formulation is cooled and comminuted. The melt viscosity is increased to 9400 poises (at 250° C.) and the nominal die swell upon extrusion is increased to 41%.

The composition is suitable for injection or extrusion blow molding and blown film extrusion.

EXAMPLE 2

The procedure of Example 1 is repeated, substituting 1.0% by weight of bis(3,4-epoxycyclohexylmethyl)adipate. The melt viscosity is increased to 17,900 poises (at 250° C.), and the nominal die swell increases to 56%.

This composition is suitable for injection or extrusion blow molding and blow film extrusion.

EXAMPLES 3 and 4

An automatic capillary plastometer is used to blend and extrude formulations of poly(1,4-butylene terephthalate) and two polyepoxides. For comparison purposes, unmodified poly(1,4-butylene terephalate) is extruded, under identical conditions, at 250° C., orifice 0.295/0.0145 inches, 80 psi shear stress.

The formulations, and properties are summarized in Table 1:

Table 1

| | Composition of Poly(1,4-butylene terephthalate) and Polyepoxides | | |
|---|---|---|---|
| Example | 3 | 4 | 3A* |
| Materials (parts by weight) | | | |
| poly(1,4-butylene terephthalate) | 99 | 99 | 100 |
| bis(3,4-epoxycyclohexylmethyl)adipate | 1 | — | — |
| bisphenol-A bisglycidyl ether | — | 1 | — |
| Properties | | | |
| melt viscosity, poises (250° C.) | 6100 | 3000 | 3000 |
| nominal die swell, % | 58 | 53 | 36 |

*Control

These data illustrate that the compositions prepared according to the present invention have enhanced melt strength and melt elasticity. Moreover, the composition with the polyepoxide containing the cyclohexane ring has a very desirable increase in melt viscosity.

EXAMPLES 5 - 8

The procedure of Example 1 is repeated, substituting several other polyepoxides for that used therein and also an unmodified polyester, for control purposes. Then, to measure the capability of the material to resist sagging under its own weight, the blends are re-extruded through the same extruder, using a ⅛ inch orifice. The extrudate is allowed to drop to the floor (about 42 inches), where it is coiled onto a sheet of cardboard moved back and forther laterally below the die. The diameter of the strands are measured. The compositions are comminuted into molding granules, injection molded and the properties of the workpieces are measured. The formulations and data are summarized in Table 2:

Table 2

| | Compositions of Poly(1,4-butylene terephthalate) and Polyepoxides | | | | |
|---|---|---|---|---|---|
| Example | 5 | 6 | 7 | 8 | 5A* |
| Materials (parts by weight) | | | | | |
| poly(1,4-butylene terephthalate) | 99 | 99 | 99 | 99 | 100 |
| bis(3,4-epoxycyclohexyl-methyl)adipate | 1 | — | — | — | — |
| 3,4-epoxycyclohexylmethyl 3,4-epoxycyclohexyl-carboxylate | — | 1 | — | — | — |
| epoxynovolac | — | — | 1 | — | — |
| bisphenol-A bisglycidyl ether | — | — | — | 1 | — |
| Properties | | | | | |
| Extrudate diameter, inches | 0.055 | 0.053 | 0.055 | N.D.* | 0.040 |
| tensile strength, psi | 7,600 | N.D. | N.D. | 7,600 | 7,300 |
| elongation, % | 320 | N.D. | N.D. | 310 | 250 |
| Gardner ductile impact strength (in.-lbs.) | 36 | N.D. | N.D. | 35 | 36 |

*Control
**N.D. - not determined.

It is demonstrated that the polyepoxides increase melt strength because the strands have greater diameter. In addition, the additives have no adverse effect on mechanical properties of the molded parts.

Obviously, other modifications are possible inview of the above examples. For instance, if the procedure of Example 1 is repeated, substituting for the poly(1,4-butylene terephthalate) the following high molecular weight linear polyesters:

a poly(ethylene terephathalate) having an intrinsic viscosity of about 0.9;

a 70/30 ethylene terephthalate-ethylene isophthalate copolyester having an intrinsic viscosity of about 0.9; or a poly(1,3-propylene terephathalate) prepared from trimethylene glycol and methyl terephthalate and having an intrinsic viscosity of about 1.0, polyester compositions with increased melt elasticity will be obtained.

Because of their greater melt strengths, the resins processed according to this invention can be used on commercial injection molding equipment to manufacture articles, such as aerosol dispensers, with a uniform wall thickness. Unmodified poly(1,4-butylene terephthalate) used in such equipment provides aerosol dispensers of non-uniform thickness, which may fail when subsequently pressurized for intended use.

Obviously, other modifications and variations of the present invention are possible in the light of the above teachings. It is therefore to be understood that changes may be made in the particular embodiments of the invention described which are within the full intended scope of the invention as defined by the appended claims.

We claim:

1. A process for increasing the melt elasticity of a high molecular weight linear polyester resin consisting essentially of poly(1,4-butylene terephthalate), said process comprising adding to said high molecular weight resin an organic compound containing at least two epoxide groups to form a mixture of said compound and said resin, the amount of said compound comprising from about 0.1 to about 5% by weight based on the total weight of the mixture, and heating the mixture until the desired increase in melt elasticity is attained.

2. A process as defined in claim 1 wherein said organic compound containing at least two epoxide groups, contains only carbon, hydrogen and oxygen.

3. A process as defined in claim 2 wherein at least one of said epoxide groups in said organic compound is on a cyclohexane ring.

4. A process as defined in claim 3 wherein said organic compound is bis(3,4-epoxycyclohexylmethyl)adipate.

5. A process as defined in claim 3 wherein said organic compound is 3,4-epoxycyclohexylmethyl 3,4-epoxycyclohexyl carboxylate.

6. A process as defined in claim 2 wherein said organic compound is bisphenol-A diglycidyl ether.

7. A process as defined in claim 2 wherein said organic compound is an epoxylated novolac.

8. A process as defined in claim 1 wherein said organic compound is present in an amount of from about 0.5 to about 2% by weight based on the total weight of said mixture.

* * * * *